US012755187B2

(12) United States Patent
Shukla et al.

(10) Patent No.: US 12,755,187 B2
(45) Date of Patent: Oct. 6, 2026

(54) PLANET-SCALE, FULLY MANAGED ARTIFICIAL INTELLIGENCE INFRASTRUCTURE SERVICE

(71) Applicant: Microsoft Technology Licensing, LLC, Redmond, WA (US)

(72) Inventors: Dharma Kiritkumar Shukla, Bellevue, WA (US); Rimma Vladimirovna Nehme, Bellevue, WA (US); Pankaj Sharma, Redmond, WA (US); Shreshth Singhal, Seattle, WA (US); Vipul Arunkant Modi, Bellevue, WA (US); Muthian Sivathanu, Chennai (IN); Atul Katiyar, Sammamish, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 1092 days.

(21) Appl. No.: 17/361,208

(22) Filed: Jun. 28, 2021

(65) Prior Publication Data

US 2022/0318674 A1 Oct. 6, 2022

(30) Foreign Application Priority Data

Mar. 30, 2021 (IN) ............................. 202141014649

(51) Int. Cl.
*G06N 20/00* (2019.01)
*G06N 5/04* (2023.01)

(52) U.S. Cl.
CPC ............... *G06N 20/00* (2019.01); *G06N 5/04* (2013.01)

(58) Field of Classification Search
CPC ................................ G06N 20/00; G06N 5/04
See application file for complete search history.

(56) References Cited

U.S. PATENT DOCUMENTS 9,984,648 B2 * 5/2018 Chakraborty .......... G09G 5/003
10,043,010 B1 * 8/2018 Striem-Amit ....... G06F 9/45558
(Continued)

OTHER PUBLICATIONS

Mayer, et al., “Scalable deep learning on distributed infrastructures: Challenges, techniques, and tools.” (Year: 2020).*
(Continued)

*Primary Examiner* — Michelle T Bechtold
*Assistant Examiner* — Matiyas T Maru
(74) *Attorney, Agent, or Firm* — Barta Jones, PLLC

(57) ABSTRACT

The disclosure herein describes managing artificial intelligence (AI) workloads in a cloud infrastructure platform. A set of distributed infrastructure resources are integrated into the cloud infrastructure platform via native support interfaces. AI workloads are received from a plurality of tenants, wherein the AI workloads include training workloads and inferencing workloads and resource subsets of the set of distributed infrastructure resources are assigned to the received AI workloads. The received AI workloads are scheduled for execution on the assigned resource subsets and based on the scheduling of the AI workloads, they are executed on the assigned resource subsets. The described cloud infrastructure platform provides efficient, secure execution of AI workloads for many different tenants and enables the flexible use of a wide variety of both third-party and first-party infrastructure resources.

20 Claims, 6 Drawing Sheets

(56) References Cited

U.S. PATENT DOCUMENTS

| | | | | |
|---|---|---|---|---|
| 10,275,851 | B1 * | 4/2019 | Zhao | G06T 1/20 |
| 10,545,796 | B2 * | 1/2020 | Bahramshahry | G06F 9/4887 |
| 2009/0094582 | A1 * | 4/2009 | Craft | G06F 9/4862 |
| 2012/0011519 | A1 * | 1/2012 | Ganesh | G06F 9/4856 |
| 2015/0029200 | A1 * | 1/2015 | Khosa | G06T 15/005 |
| 2019/0034237 | A1 * | 1/2019 | Siddappa | G06F 9/45558 |
| 2019/0220601 | A1 * | 7/2019 | Sood | G06F 21/53 |
| 2019/0272461 | A1 * | 9/2019 | Ravindranath | G06N 3/0454 |
| 2019/0332411 | A1 * | 10/2019 | Leitao | G06F 9/4418 |
| 2021/0216375 | A1 * | 7/2021 | Sivaraman | G06F 9/5077 |

OTHER PUBLICATIONS

Crankshaw et al., "Clipper: A {Low-Latency} online prediction serving system." (Year: 2017).*
Peng et al., "Optimus: an efficient dynamic resource scheduler for deep learning clusters." (Year: 2018).*
Sparks et al., "Automating model search for large scale machine learning." Proceedings of the Sixth ACM Symposium on Cloud Computing. (Year: 2015).*
Chaudhary, Shubham, et al. "Balancing efficiency and fairness in heterogeneous GPU clusters for deep learning" (Year: 2020).*
Xiao, et al., "Gandiva: Introspective cluster scheduling for deep learning" (Year: 2018).*
Jain et al., "CRAC: checkpoint-restart architecture for CUDA with streams and UVM." (Year: 2020).*
Mayer, Ruben, and Hans-Arno Jacobsen. "Scalable deep learning on distributed infrastructures: Challenges, techniques, and tools." (Year: 2020).*
Peng, et al., "Optimus: an efficient dynamic resource scheduler for deep learning clusters." Proceedings of the Thirteenth EuroSys Conference (Year: 2018).*
"Akka", Retrieved from: https://web.archive.org/web/20210413062408/https://akka.io/, Apr. 13, 2021, 4 Pages.
"Checkpoint/Restore in User Space", Retrieved from: https://web.archive.org/web/20210326043234/https://criu.org/Main_Page, Mar. 26, 2021, 3 Pages.
"gRPC, A High-Performance, Open-source Universal RPC Framework. ", Retrieved from: https://web.archive.org/web/20210416144134/https://grpc.io/, Apr. 16, 2021, 2 Pages.
"Hadoop: Fair Scheduler", Retrieved from: https://hadoop.apache.org/docs/r2.7.4/hadoop-yarn/hadoop-yarn-site/FairScheduler.html, Jul. 29, 2017, 7 Pages.
"The Scala Programming Language", Retrieved from: https://www.scala-lang.org./, Apr. 18, 2021, 13 Pages.
Ausubel, et al., "The Lovely but Lonely Vickrey Auction", In Book Combinatorial Auctions, vol. 17, Jan. 2006, 37 Pages.
Boag, et al., "Scalable Multi-Framework Multi-Tenant Lifecycle Management of Deep Learning Training Jobs", In Proceedings of 31st Conference on Neural Information Processing Systems, Dec. 4, 2017, pp. 1-8.
Burns, et al., "Borg, Omega, and Kubernetes", In Proceedings of ACM Queue, vol. 14, Jan. 2016, pp. 70-93.
Chandra, et al., "Hierarchical Scheduling for Symmetric Multiprocessors", In Journal of IEEE Transactions on Parallel and Distributed Systems, vol. 19, Issue 3, Mar. 2008, pp. 418-431.
Cho, et al., "On the Properties of Neural Machine Translation: Encoder-Decoder Approaches", In Repository of arXiv:1409.1259v1, Sep. 3, 2014, 9 Pages.
Feitelson, et al., "Utilization and Predictability in Scheduling the IBM SP2 with Backfilling", In Proceedings of the First Merged International Parallel Processing Symposium and Symposium on Parallel and Distributed Processing, Mar. 30, 1998, pp. 542-546.
Ghodsi, et al., "Choosy: Max-Min Fair Sharing for Datacenter Jobs with Constraints", In Proceedings of the 8th ACM European Conference on Computer Systems, Apr. 15, 2013, pp. 365-378.
Ghodsi, et al., "Dominant Resource Fairness: Fair Allocation of Multiple Resource Types", In Proceedings of 8th USENIX Conference on Networked Systems Design and Implementation, Mar. 30, 2011, pp. 1-14.
Gog, et al., "Firmament: Fast, Centralized Cluster Scheduling at Scale", In 12th USENIX Symposium on Operating Systems Design and Implementation, Nov. 2, 2016, pp. 99-115.
Grandl, et al., "Graphene: Packing and Dependency-Aware Scheduling for Data-parallel Clusters", In Proceedings of 12th USENIX Symposium on Operating Systems Design and Implementation, Nov. 2, 2016, pp. 81-97.
Grandl, et al., "Multi-Resource Packing for Cluster Schedulers", In Proceedings of the ACM SIGCOMM Computer Communication Review, vol. 44, Issue 4, Aug. 17, 2014, pp. 455-466.
Gu, et al., "Tiresias: A GPU Cluster Manager for Distributed Deep Learning", In Proceedings of 16th USENIX Symposium on Networked Systems Design and Implementation, Feb. 26, 2019, pp. 485-500.
He, et al., "Deep Residual Learning for Image Recognition", In Proceedings of the IEEE Conference on Computer Vision and Pattern Recognition, Jun. 27, 2016, pp. 770-778.
Hindman, et al., "Mesos: A Platform for Fine-Grained Resource Sharing in the Data Center", In Proceedings of 8th USENIX Conference on Networked Systems Design and Implementation, vol. 11, Mar. 30, 2011, pp. 1-14.
Isard, et al., "Dryad: Distributed Data-Parallel Programs from Sequential Building Blocks", In Proceedings of the 2nd ACM SIGOPS/EuroSys European Conference on Computer Systems, Mar. 21, 2007, pp. 59-72.
Isard, et al., "Quincy: Fair Scheduling for Distributed Computing Clusters", In Proceedings of the ACM SIGOPS 22nd Symposium on Operating Systems Principles, Oct. 11, 2009, pp. 261-276.
Jeon, et al., "Analysis of Large-Scale Multi-Tenant GPU Clusters for DNN Training Workloads", In Proceedings of USENIX Annual Technical Conference, Jul. 10, 2019, pp. 947-960.
Jeon, et al., "Multi-Tenant GPU Clusters for Deep Learning Workloads: Analysis and Implications", In Microsoft Research Technical Report (MSR-TR-2018-13), May 2018, 14 Pages.
Kingma, et al., "Stochastic Gradient VB and the Variational Auto-Encoder", In Proceedings of the International Conference on Learning Representations, Apr. 14, 2014, 14 Pages.
Krizhevsky, et al., "CIFAR-10 (Canadian Institute for Advanced Research)", Retrieved from: https://web.archive.org/web/20210125051132/https://academictorrents.com/details/463ba7ec7f37ed414c12fbb71ebf6431eada2d7a, Jan. 25, 2021, 2 Pages.
Li, et al., "Massively Parallel Hyperparameter Tuning", In Repository of arXiv:1810.05934v3, Nov. 29, 2018, 15 Pages.
Martin, et al., "A Database of Human Segmented Natural Images and its Application to Evaluating Segmentation Algorithms and Measuring Ecological Statistics", In Proceedings of the Eighth International Conference on Computer Vision, vol. 2, Jul. 7, 2001, pp. 416-423.
Merkel, Dirk, "Docker: Lightweight Linux Containers for Consistent Development and Deployment", Linux Journal, vol. 239, Mar. 1, 2014, 5 Pages.
Myers, et al., "How to Mount Blob Storage as a File System with Blobfuse", Retrieved from: http://web.archive.org/web/20210308132745/https://docs.microsoft.com/bs-latn-ba/azure/storage/blobs/storage-how-to-mount-container-linux, Feb. 1, 2019, 7 Pages.
Nisan, et al., "Algorithmic Game Theory", In Publication of Cambridge University Press, Sep. 24, 2007, 775 Pages.
Peng, et al., "Optimus: An Efficient Dynamic Resource Scheduler for Deep Learning Clusters", In Proceedings of the Thirteenth EuroSys Conference Pattern Recognition, Apr. 23, 2018, 14 Pages.
Picus, et al., "Word-Level Language Modeling RNN", Retrieved from: https://github.com/pytorch/examples/tree/master/word_language_model, Jul. 7, 2020, 3 Pages.
Popa, et al., "FairCloud: Sharing the Network in Cloud Computing", In Proceedings of the ACM SIGCOMM Conference on Applications, Technologies, Architectures, and Protocols for Computer Communication, Aug. 13, 2012, pp. 187-198.
Radford, et al., "Unsupervised Representation Learning with Deep Convolutional Generative Adversarial Networks", In Repository of arXiv:1511.06434v1, Nov. 19, 2015, 15 Pages.

(56) References Cited

OTHER PUBLICATIONS

Sergeev, et al., "Horovod: Fast and Easy Distributed Deep Learning in TensorFlow", In Repository of arXiv:1802.05799v3, Feb. 21, 2018, 10 Pages.
Shi, et al., "Real-Time Single Image and Video Super-Resolution using an Efficient Subpixel Convolutional Neural Network", In Proceedings of the IEEE Conference on Computer Vision and Pattern Recognition, Jun. 2016, pp. 1874-1883.
Vavilapalli, et al., "Apache Hadoop YARN: Yet Another Resource Negotiator", In Proceedings of the 4th Annual Symposium on Cloud Computing, Oct. 1, 2013, 16 Pages.
Waldspurger, Carl A. , "Lottery and Stride Scheduling: Flexible Proportional-Share Resource Management", In Doctoral Dissertation, Massachusetts Institute of Technology, Sep. 1995, 151 Pages.
Waldspurger, et al., "Lottery Scheduling: Flexible Proportional-Share Resource Management", In Proceedings of the 1st USENIX Conference on Operating Systems Design and Implementation, Nov. 14, 1994, 11 Pages.
Xiao, et al., "Gandiva: Introspective Cluster Scheduling for Deep Learning", In Proceedings of 13th USENIX Symposium on Operating Systems Design and Implementation, Oct. 8, 2018, pp. 595-610.
Xie, et al., "Aggregated Residual Transformations for Deep Neural Networks", In Proceedings of IEEE Conference on Computer Vision and Pattern Recognition, Jul. 2017, pp. 1492-1500.
You, et al., "Large Batch Optimization for Deep Learning: Training BERT in 76 Minutes", In Proceedings of 8th International Conference on Learning Representations, Apr. 26, 2020, pp. 1-37.
Yu, et al., "DryadLINQ: A System for General-Purpose Distributed Data-Parallel Computing Using a High-Level Language", In Proceedings of the 8th USENIX Conference on Operating Systems Design and Implementation, vol. 8, Dec. 8, 2008, pp. 1-14.
"International Search Report and Written Opinion Issued in PCT Application No. PCT/US22/019214", Mailed Date Jun. 8, 2022, 9 Pages.
Lecun, et al., "The Mnist Database of Handwritten Digits", Retrieved from: http://yann.lecun.com/exdb/mnist/, Apr. 17, 2021, 7 Pages.
Chaudhary, et al., "Balancing Efficiency and Fairness in Heterogeneous GPU Clusters for Deep Learning", In Proceedings of the Fifteenth European Conference on Computer Systems, Apr. 27, 2020, 16 Pages.
"International Search Report and Written Opinion Issued in PCT Application No. PCT/US22/019213", Mailed Date: Jun. 8, 2022, 9 Pages.
First Office Action Received for Chinese Application No. 202280022711.1, mailed on Mar. 29, 2026, 26 Pages (English Translation Provided).
First Examination Report Received for Indian Patent Application No. 202317062704, mailed on July 27, 2026, 08 pages.

* cited by examiner

PLANET-SCALE, FULLY MANAGED ARTIFICIAL INTELLIGENCE INFRASTRUCTURE SERVICE

CROSS-REFERENCE TO RELATED APPLICATIONS

This application claims the benefit of India provisional application number 202141014649 filed on Mar. 30, 2021 and entitled "PLANET-SCALE, FULLY MANAGED AI INFRASTRUCTURE SERVICE", which is hereby incorporated by reference in its entirety for all intents and purposes.

BACKGROUND

The speed and scale of artificial intelligence (AI) innovations require highly scalable, performant, robust, and technically efficient AI infrastructure. Current methods of incrementally extending existing general-purpose infrastructure as a service (IaaS) and cloud-based environments have significant limitations as AI workloads are fundamentally different and necessitate purpose-built AI infrastructure. Furthermore, managing the minutia of current infrastructure presents substantial challenges to data scientists trying to accelerate the algorithmic innovations of AI.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for managing AI workloads in a cloud infrastructure platform is described. A set of distributed infrastructure resources are integrated into the cloud infrastructure platform via native support interfaces. Then, AI workloads are received from a plurality of tenants, wherein the AI workloads include training workloads and inferencing workloads and resource subsets of the set of distributed infrastructure resources are assigned to the received AI workloads. The received AI workloads are scheduled for execution on the assigned resource subsets and based on the scheduling of the AI workloads, they are executed on the assigned resource subsets.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
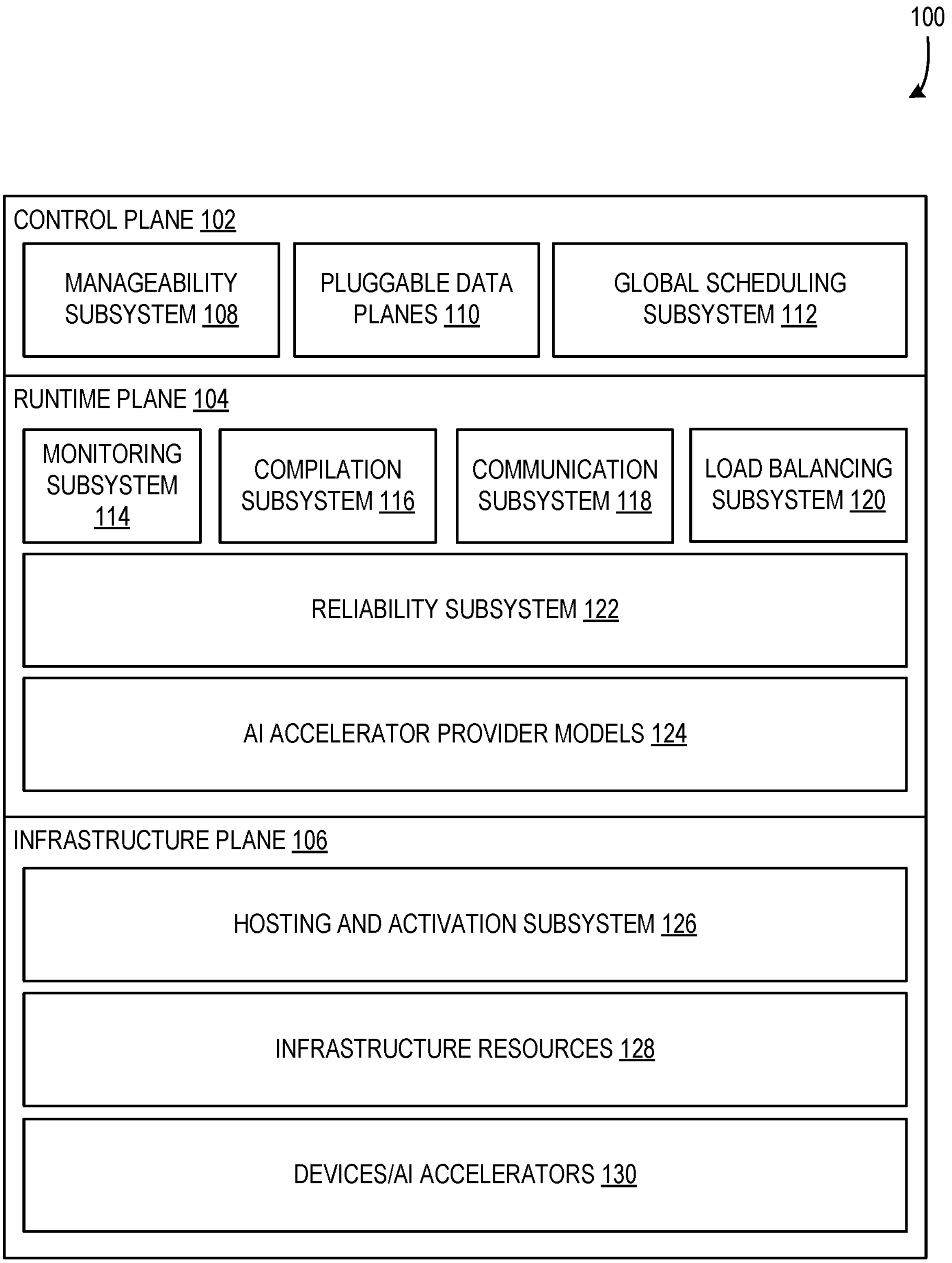
FIG. 1 is a block diagram illustrating a system configured for providing infrastructure service for artificial intelligence (AI) workloads.

The various embodiments will be described in detail with reference to the accompanying drawings. Wherever possible, the same reference numbers will be used throughout the drawings to refer to the same or like parts. References made throughout this disclosure relating to specific examples and implementations are provided solely for illustrative purposes but, unless indicated to the contrary, are not meant to limit all examples.

Aspects of the disclosure provide a computerized method and system for managing the execution of artificial intelligence (AI) workloads, such as training and inferencing workloads, using a diverse, distributed pool of infrastructure resources. Distributed infrastructure resources (first-party and third-party) are integrated into the cloud infrastructure platform via native support interfaces, enabling many entities to make use of their own infrastructure to add to the global pool of resources. AI workloads are received from a plurality of tenants and resource subsets of the set of distributed infrastructure resources are assigned to the received AI workloads, including securing the AI workloads from each other using containers, enabling multiple AI workloads to be executed securely on the same server. The received AI workloads are scheduled for execution on the assigned resource subsets and, based on the scheduling of the AI workloads, they are then executed on the assigned resource subsets.

Cloud infrastructure includes hardware accelerators, computer networking and storage—all of which are bundled together in a workload-aware manner. AI workloads (e.g., Deep Learning Training (DLT) and inferencing) are special in how they operate in that they are written, architected, and execute in a specific manner. Currently, general-purpose cloud-based IaaS are used for DLT and inferencing jobs, which require data scientists to set their AI DLT problems, execute them, and solve any resultant problems that may occur from today's IaaS.

This has resulted in multiple trends. DLT workloads are growing exponentially (e.g., 10× per year). As a result, the industry is responding to this uptick in DLT workloads by including more hardware in the IaaS environments, e.g., buy more graphics processing units (GPUs) or other hardware accelerators, add more nodes, and build out more distributed clusters. Yet, if the models continue to grow exponentially, it becomes untenable to grow IaaS systems in such an exponential manner. There are limits to the size of cloud infrastructures, from a practical standpoint. Aspects of the disclosure solve these and other technical problems in unconventional ways.

The disclosed examples provide a "Singularity" service that increases efficiencies from today's fixed infrastructure resource (including hardware accelerators, networking, storage, etc.) and drives the most technical efficiencies as the models continue to grow or as the number of DLT jobs and/or other AI workloads increase. For instance, the disclosed service operates in an unconventional manner by allowing for an IaaS or other infrastructure to grow to accommodate large numbers of DLT jobs or function as smaller groups of IaaSs that facilitate different DLT job processing. Conventional general-purpose IaaSs are not able to the handle these large increases in DLT jobs because today's general-purpose IaaSs are developed to be workload-agnostic. The disclosed service, on the other hand, is designed to build purpose-built workloads that may be efficiently processed in an IaaS. The AI infrastructure service of the disclosure is operable with all AI workloads, including training (e.g., workloads for training new or updated AI models) and inferencing (e.g., workloads for using trained AI models to evaluate and make inferences from data).

More specifically, an example of the disclosed service is a fully managed, globally distributed, multi-tenant AI infrastructure service with native support for third-party (3 P) hardware (e.g., different companies than the company operating a cloud environment), custom silicon, application-specific integrated circuit (ASIC), GPU, central processing unit (CPU), and first party (1 P) hardware (the company operating the cloud environment), for DLT job training and inferencing workloads. With the disclosed service, an AI planet-scale computer infrastructure is used for training and inferencing at any scale, with the highest technical efficiency and differentiated capabilities which significantly improves the productivity of data scientists. The disclosed service manages 3 P (e.g., GPUs and field-programmable gate arrays (FPGAs)) and 1 P AI hardware capacity and enabling high-level services, like AZURE® machine learning (ML), to build experiences and tools to serve customers.

While the disclosed examples are discussed in relation to DLT jobs and inferences, any kind of AI job may be migrated using the disclosed techniques. Such jobs may be long-running (e.g., processing for several hours or days or weeks or months).

The disclosed embodiments and the examples mention the Azure cloud service provided by the MICROSOFT CORPORATION, headquartered in Redmond, Washington, USA. But any large-scale cloud infrastructure may utilize the disclosed service.

The following are example capabilities that the disclosure provides along with the corresponding technical design description.

The disclosure provides high-efficiency AI training and inferencing by driving the high utilization of resources. Secure, fine-grained multi-tenancy service is provided with high-density containerized hosting. For instance, such service may be provided using Hyper-V isolated containers on bare-metal machines. The disclosed service is able to both securely and densely pack multiple 1 P and 3 P tenants on the same hosts, enabling highly efficient use of compute and AI hardware capacity across the cloud service. High-density workloads that belong to different tenants are enabled. For example, AI workloads can run alongside search workloads.

The disclosure provides multiplexing or interspersing of inferencing and training workloads on the same shared pool of resources. By sharing the same pool of cloud-wide resources for both inferencing and training, more efficient scheduling and packing of workloads is enabled to maximize use of hardware capacity and deal with fluctuations in the mix of workloads and demand for resources of the shared pool. By contrast, in conventional services, inferencing workloads and training workloads are on different pools of resources, fragmenting the capacity. Instead, the disclosed service multiplexes the training and inferencing workloads on the same pool of cloud resources (e.g., hardware accelerators, compute resources, networking resources, and storage resources, etc.). This benefits the ability to further saturate the hardware density and dynamically load balance the cloud resources to adjust to spikes or lulls in computing needs for either the training or inferencing workloads, thereby driving efficiencies to the maximum ability. DLT workloads and inferencing workloads need topological collocation of the nodes and the hardware associated with a job. In some examples, the disclosed service intersperses inferencing workloads on top of or in between training workloads, helping drive efficiencies and finish more jobs through the IaaS.

The disclosed service provides cloud-wide (e.g., global), topology & workload-aware scheduling of AI workloads. A global scheduler is provided to exploit the heterogeneity of workloads (e.g., differing attributes between training jobs, inferencing jobs, etc.) and to provide dynamic, topology-aware scheduling of resources across the entire AI hardware capacity in the cloud. Specifically, with its ability to transparently checkpoint the processor and the device state constituting a job or workload (e.g., saving the state of a workload without any involvement from the user or changes to the frameworks or changes to the training script logic), the disclosed scheduler is able to transparently preempt any running job, live migrate any running job, and/or elastically scale up/down and load balance the workers of the service to drive the highest utilization without impacting the performance or downtime. Additionally, the disclosed scheduler is configured to be aware of all the jobs across the entire IaaS (e.g., a global view of the workload(s) across the entire IaaS). For example, the scheduler used by the disclosed service is configured to identify groups of GPUs/CPUs/hardware accelerators that are not being efficiently utilized and therefore migrate jobs on such groups to other GPUs/CPUs/hardware accelerators by transparently checkpointing and verifying processor device states for migration to occur. The scheduler is further configured to monitor and/or track workloads that are currently running and hardware capacity that is currently available anywhere around the world in the cloud of the disclosed service. Additionally, the scheduler is configured to decide if and/or when to preempt a job, migrate a job, scale up or scale down the job, or load-balance between different workers for a job.

The disclosed service is configured to manage AI workloads in a priority-driven and/or tier-driven manner. When the disclosed scheduler makes decisions regarding AI training or inference workloads, the scheduler may consider the designated tier of a given job (or an inferencing model) or associated job submitter. Each tier may be defined with different technical requirements. For example, if a job is submitted with the highest tier level, indicating a best-capacity tier, the job is run with the least preemption, the equivalent of running on dedicated cloud resources. If a job is submitted at a middle tier, there is some preemption or migration experienced that may "slow" the job somewhat but drive efficiencies and improving the overall utilization of the fixed pool of resources. If the job is submitted at the lowest tier, the job is preempted frequently, providing the experience similar to spot virtual machines (VMs), but with the guarantee that the job will be completed, albeit not necessarily at the fastest pace. Numerous examples exist of different tiers that need not be exhaustively discussed herein, other than to say that DLT training and inferencing jobs may be scheduled based, at least partially, on their associated tier, which may be specific to the job, the customer, and/or the capacity kind. Today, there are no systems that provide tier-based guarantees to DLT training and inferencing jobs.

The disclosed system is configured to provide reliable and performant AI infrastructure. Without reliable infrastructure, utilization will always be sub-optimal. This is because planned and unplanned failures result into lost GPU hours and productivity. For example, if a large job is running for months on hundreds of nodes and GPUs, eventually, some of the GPUs will become unhealthy or need to be upgraded during the job's processing. This has an impact on the customer workload. By virtue of how AI workloads operate, any stall in the health of a GPU may stall the entire AI workload job and progress may be stopped. Worse still, if the job or model has not been checkpointed, precious processing may be lost. To overcome this, the disclosed system provides capabilities such as transparent preemption, dynamic load-balancing, defragmentation, and elasticity that all enable a highly reliable infrastructure.

The disclosure deeply integrates the bare-metal computing, networking, and the driver stacks of 1 P and 3 P accelerators by providing at least the following technical contributions: (i) a bandwidth optimal distributed barrier and rendezvous protocol implementation directly inside the backend network communication stack to implement distributed agreement protocol among an ensemble of accelerator devices and worker processes, and (ii) transparent and consistent checkpointing and restoration of process and device state to enable transparent preemptive scheduling, failover, live migration, and dynamic elasticity—all without impacting the model convergence and without requiring any help from the user or frameworks. The disclosed service provides for AI jobs to be checkpointed so that their device state may be captured and then restored on other nodes, without impacting the correctness of the model or the model's convergence—at the infrastructure layer.

The disclosed service is configured to provide global distribution of inferencing endpoints for (a) predictable single digit millisecond latencies at 99th percentile (P99), anywhere around the world and (b) high availability in the face of regional disasters. When a user submits an inferencing workload, the inferencing model may be deployed across different geographic regions and run in the closest region.

The disclosed service is configured to provide vertical integration for both 3 P and 1 P hardware. The example architecture of illustrated in FIG. 1 below is designed for the future, with built-in extensibility to be agile as new scenarios and technologies emerge. The disclosed design is flexible with respect to the following: providing first class support for both 3 P and 1 P AI accelerators; providing disaggregated and aggregated topologies; providing non-uniform backend network configuration, providing extensible, layered architecture; enabling extensible scheduling systems for customizability by tenants; enabling extensible heterogeneous accelerators, devices, and/or hardware; and providing a compiler tool chain that is agnostic of AI training and inferencing frameworks.

The disclosure provides a unified abstraction on top of a wide range of both 3 P and 1 P AI accelerators, and can map a given training job or an inferencing endpoint across a mix of heterogeneous device types to drive the highest efficiency.

Along with supporting standard server-style compute topologies, the disclosed service is configured to support and drive a cloud computing environment's disaggregation strategy and/or other similar strategies associated with other cloud platforms. Aggregated topologies include devices that are physically attached to the servers, such that one does not need to go through a backend network. Disaggregated topologies include a rack of compute nodes and a rack of hardware accelerators that may make use of a backend network. The disclosed service abstracts both of these topologies.

The disclosed service is configured to support a variety of non-uniform backend network architectures envisioned by different first party and third-party hardware manufacturers.

The disclosed service provides a layered architecture that supports extensibility at every level, including pluggable data planes (e.g., the orchestration layer extensibility supports plugging in alternate data planes or an orchestrator below its scheduler to support Kubernetes running in a customer's private data center), pluggable scheduling subsystems (e.g., the scheduling layer extensibility supports plugging in alternate schedulers and custom policies below its control plane to support gradual migration to the disclosed service), and pluggable heterogeneous device types and accelerators (e.g., the disclosure is designed to enable a consistent model for provisioning and scaling accelerator devices with a pluggable device provider interface, including quantum-computing devices).

The disclosed service is configured to provide a compiler toolchain that is agnostic of AI training and inferencing frameworks. The service does not rely on any help from the user or frameworks for providing its core capabilities. It is designed to be agnostic of AI training and inferencing frameworks and tools. It does not require the user to opt into any specific framework, compiler toolchain or library. The service integrates at the level of device drivers and the device-to-device communication channels for supporting various hardware specific capabilities.

The disclosed service provides a highly scalable AI infrastructure. The service is designed to scale across 100s of datacenters and tens of thousands of accelerators with training models of trillions of parameters. The service may be configured to cross-geographical boundaries as well. The architecture is also capable of treating training jobs and inferencing services as equal when they originate from data centers as well as on premises sources.

While the aspects of the disclosure have been described in terms of various examples with their associated operations, a person skilled in the art would appreciate that a combination of operations from any number of different examples is also within scope of the aspects of the disclosure.

While the examples provided involve implementations using GPUs, it will be appreciated that FPGAs, ASICs, or other specialized hardware may be used similarly to carry out the functionality described herein.

FIG. 1 is a block diagram illustrating a system 100 configured for providing infrastructure service for AI workloads according to an embodiment. The system 100 includes a control plane 102, a runtime plane 104, and an infrastructure plan 106. In some examples, the system 100 is a distributed computing infrastructure system that includes hardware devices distributes across many different locations (e.g., a global or planet-scale distributed system). Further, the system 100 is configured specifically to enable the execution of AI workloads, such that the hardware, firmware, and/or software of the system 100 is configured to enable efficient execution of tasks associated with AI workloads. Alternatively, or additionally, the system 100 may include hardware, firmware, and/or software configured specifically to enable the execution of other types of workloads without departing from the description.

The control plane 102 includes a manageability subsystem 108, pluggable data planes 110, and a global scheduling subsystem 112. In some examples, the control plane 102 is configured to receive or accept AI workloads and associated data through a variety of extensible or pluggable data planes 110 that may be defined by the tenants of the system (e.g., plugging in an alternate data plane below the scheduler to support Kubernetes or another similar system running in a tenant's private data center). Those AI workloads are scheduled for execution on the infrastructure of the system 100 (e.g., the infrastructure plane 106), as described herein.

The manageability subsystem 108 includes hardware, firmware, and/or software configured to provide interactive processing of AI workload requests to tenants. Further, the manageability subsystem 108 is configured to provide all infrastructure resources of the system 100 in all regions of the system's operation. In some examples, the manageability subsystem 108 includes manageability replicas in various regions of the system 100 such that the infrastructure resources of the system 100 are multi-mastered by various replicas as an interface between tenants and the system 100. The manageability subsystem 108 may be decoupled from the global scheduler subsystem 112.

The global scheduler subsystem 108 includes hardware, firmware, and/or software configured to schedule AI workloads/jobs for execution on the infrastructure resource of the system 100 as described herein. In some examples, the global scheduler subsystem 108 includes hierarchical schedulers: global scheduler(s), regional schedulers, and coordinator services. The global scheduler is responsible for preparing schedules corresponding to the AI workloads (e.g., jobs, models, and/or pods) and handing them over to the regional schedulers based on those prepared schedules. The regional scheduler is responsible for managing and reporting regional capacity with the global scheduler and then also executing the schedule received from the global scheduler. The coordinator service is responsible for translating the schedules into physical resource allocations across clusters of infrastructure resources within a region. The coordinator service may also constitute or otherwise be closely associated with the reliability subsystem 122 as described herein. The global scheduling sub system 112 is described in greater detail below.

The runtime plane 104 includes subsystems configured to enable the AI workloads to be distributed to and executed on the infrastructure plane 106 as described herein. Such subsystems may include a monitoring subsystem 114, a compilation subsystem 116, a communication subsystem 118, and/or a load balancing subsystem 120. Further, the runtime plane 104 includes a reliability subsystem 122 configured for securing the reliability of execution of AI workloads while enabling such workloads to be checkpointed and/or migrated throughout the infrastructure resources of the system 100. The runtime plane 104 further includes AI accelerator provider models 124 that are configured to enable the use of a variety of libraries and/or configurations for managing AI accelerators when executing AI workloads. The runtime plane 104 is described in greater detail below.

The ability to checkpoint any deep learning training job and resume it from the same point on a different node is a key building block that enables several important features in the AI infrastructure platform. At a high level, any solution for platform-level checkpointing of a live deep neural network training job needs to capture device state, i.e., GPU state, and CPU state. GPU state includes GPU data (e.g., model parameters, optimizer state that is located in the GPU) and GPU context (e.g., the default stream in GPU, various handles created by libraries such as "DNN," "Blas," etc.). Checkpointing libraries may be used to handle CPU state, but they fail when the address space is polluted with GPU-related state. To resolve this conflict, a proxy-based dual process architecture may be adopted. In this instance, all GPU-related activity is isolated into a separate proxy process in a different address space while the regular compute (e.g., the user's Python code) happens in the main process. In order to move GPU-related activity into a separate address space, dynamic library interposition is used on all GPU calls. These calls get intercepted in the main process by the client of the proxy, which serializes the parameters, and writes them into shared memory. The proxy server reads the function parameters from the shared memory and executes the corresponding GPU calls in its own address space, and ships back the return values to the main host process back through the shared memory.

Checkpointing may be timed to occur when GPU memory usage is at or near a local minimum. Deep learning training jobs exhibit periodic memory patterns, with memory usage peaking during the forward pass (due to activations) and dropping substantially after the backward pass releases those activations. By integrating a custom memory allocator into the training framework, the platform can accurately monitor memory usage in real time. Checkpoints may then be triggered at a point when memory usage falls within a threshold, e.g., within 10%, of the minimum value, thereby reducing the volume of GPU state that must be copied to host memory and lowering the overall checkpoint overhead. This approach enables frequent and fine- grained checkpointing at iteration boundaries while minimizing impact on training performance.

Stateful API calls create handles to contexts, streams, events, etc., or set associations between handles or change configuration. All stateful API calls are captured in a log and replayed upon restore in the same chronological order. To save space, the log can be compressed by (1) detecting idempotent changes and not recording them for replay, (2) if a handle is created and later destroyed, all the creation, change configuration, set association calls in the log linked to that handle can be removed.

Embodiments may include virtualization of GPU handles to ensure consistent state across checkpoint and restore. GPU-related APIs such as stream creation, event creation, and BLAS or DNN library initialization often return opaque physical handles that are stored in host-side data structures. The handles are essentially pointers to data objects such as contexts, streams, or events stored in the GPU. Upon restoration on a different device, the physical handle values generated by the GPU may differ, creating inconsistency in the host process state. To address this, the platform returns a virtual handle to the host process in place of the physical handle. The mapping between virtual handles and corresponding physical handles is maintained by the checkpointing system and updated as part of the restore procedure. As a result, host-side code operates only on stable virtual handles, which retain their meaning across devices and checkpoint boundaries, thereby ensuring correctness and fidelity of execution state.

The infrastructure plane 106 includes hardware, firmware, and/or software for executing the AI workloads based on the schedules provided by the control plane 102 and instructions received from the runtime plane 104. The infrastructure plane 106 includes hosting and activation subsystems 126, infrastructure resources 128, and devices/AI accelerators 130. The infrastructure plane 106 is described in greater detail below.

Figure 2:
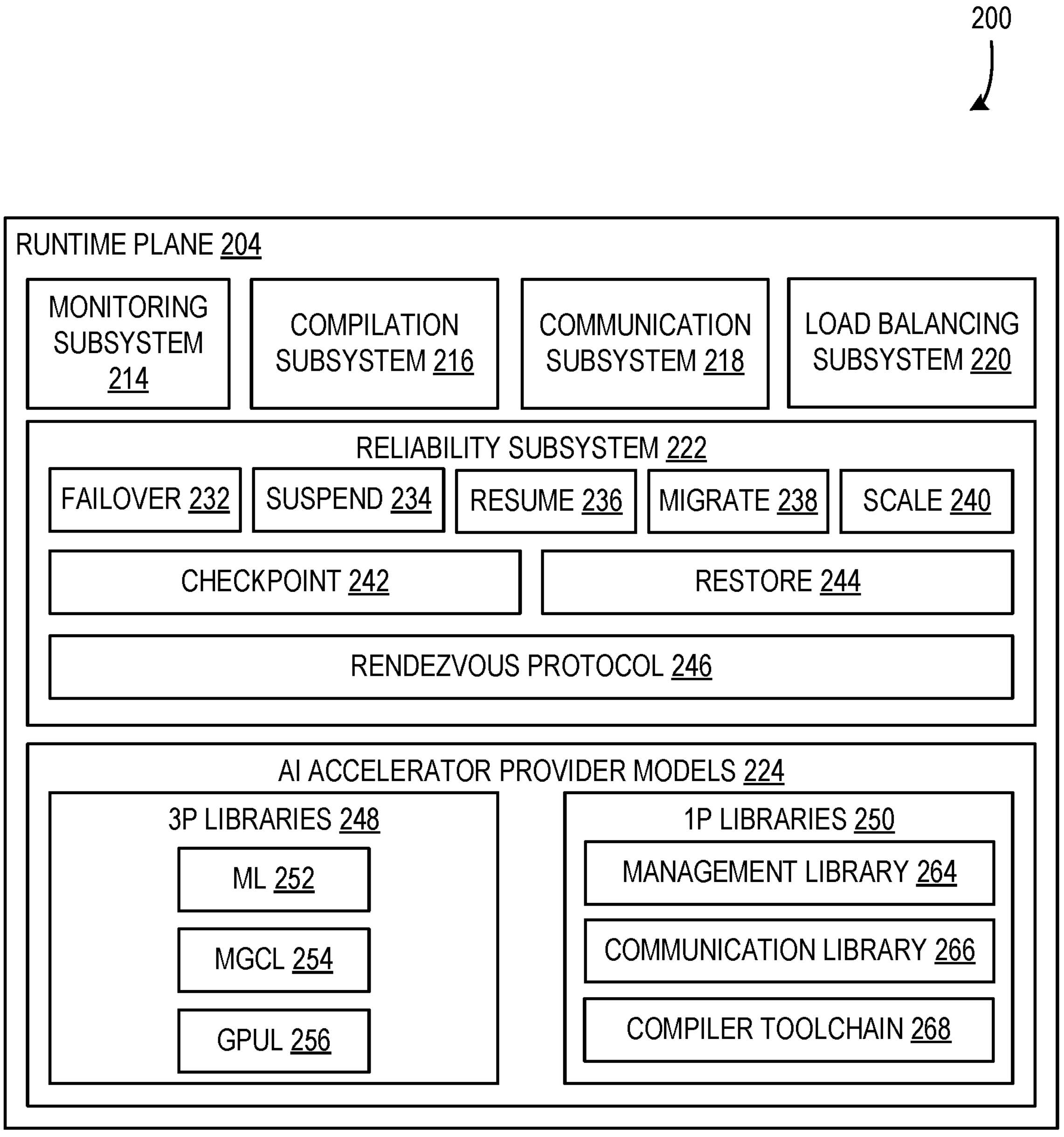
FIG. 2 is a block diagram illustrating a runtime plane of the system of FIG. 1.

FIG. 2 is a block diagram 200 illustrating a runtime plane 204 of the system 100 of FIG. 1 according to an embodiment. In some examples, the runtime plane 204 is substantially the same as the runtime plane 104 described above with respect to FIG. 1. The runtime plane 204 includes a monitoring subsystem 214, a compilation subsystem 216, a communication subsystem 218, a load balancing subsystem 220, a reliability subsystem 222, and AI accelerator provider models 224.

The reliability subsystem 222 includes routines for interacting with AI workloads to ensure their reliability. In some examples, the routines include failover 232, suspend 234, resume 236, migrate 238, scale 240, checkpoint 242, and restore 244. The checkpoint 242 and restore 244 routines may be configured as the core routines and the other routines (failover 232, suspend 234, resume 236, migrate 238, and scale 240) may be configured to use checkpoint 242 and/or restore 244 routines to achieve the desired results.

The checkpoint 242 routine is configured to save the state of an AI workload as it is executed, such that the saved state can be used to continue execution of the AI workload from the saved point in time. Checkpoint 242 may be used to perform the suspend 234 routine to halt the execution of an AI workload for a period of time and/or to perform the migrate 238 routine to save the state of the AI workload such that it can be moved to another set of infrastructure resources for continued execution.

The restore 244 routine is configured to take a saved state of an AI workload as input and restore the execution of the AI workload on infrastructure resources starting at the point of the saved state. The restore 244 routine may be used to perform the resume 236 routine and/or to restore the execution of an AI workload that has been migrated to another set of infrastructure resources based on a migrate 238 routine.

The failover 232 routine is configured to checkpoint the state of an AI workload based on detection of a failure of the current infrastructure resources and to restore the AI workload on a new set of infrastructure resources, such that the AI workload recovers from the detected failure.

The scale 240 routine is configured to scale up and/or scale down the quantity, quality, and/or type of infrastructure resources being used to execute an AI workload. For instance, if additional infrastructure resources are available, an AI workload may be scaled up to make use of those additional infrastructure resources. Alternatively, if a new AI workload requires some infrastructure resources in use executing a current AI workload, the current AI workload may be scaled down to free up some resources for the new AI workload (e.g., the new AI workload may be associated with a higher priority or tier than the current AI workload).

The reliability subsystem 222 further includes a rendezvous protocol 246 configured to synchronize or otherwise enforce synchronization on AI workloads upon which the above-described routines are to be applied. For instance, if an AI workload is going to be migrated, the rendezvous protocol 246 is configured to synchronize the operations of the system such that the resources involved in the migration are not altered during the migration process. Such a rendezvous protocol 246 may include use of locking or forming a barrier such that processes that are otherwise not associated with the migration do not affect the migration inadvertently.

The AI accelerator provider models 224 are configured to enable the use of various software stacks, including 3 P libraries 248 (e.g., libraries provided by tenants of the system 100) and/or 1 P libraries 250 (e.g., libraries provided by the entity that manages the system 100). For instance, 3 P libraries 248 may include a 3 P-specific management library (ML) 252, 3 P-specific multi-GPU communications library (MGCL) 254, and 3 P-specific GPU library (GPUL) 256. Additionally, or alternatively, 1 P libraries 250 may include a management library 264, a communication library 266, and/or a compiler toolchain 268. The runtime plane 204 enables tenants to make use of a wide variety of software stacks and associated libraries, including their own software stacks, to execute AI workloads within the described system 100 based on its extensible, flexible configuration.

Figure 3:
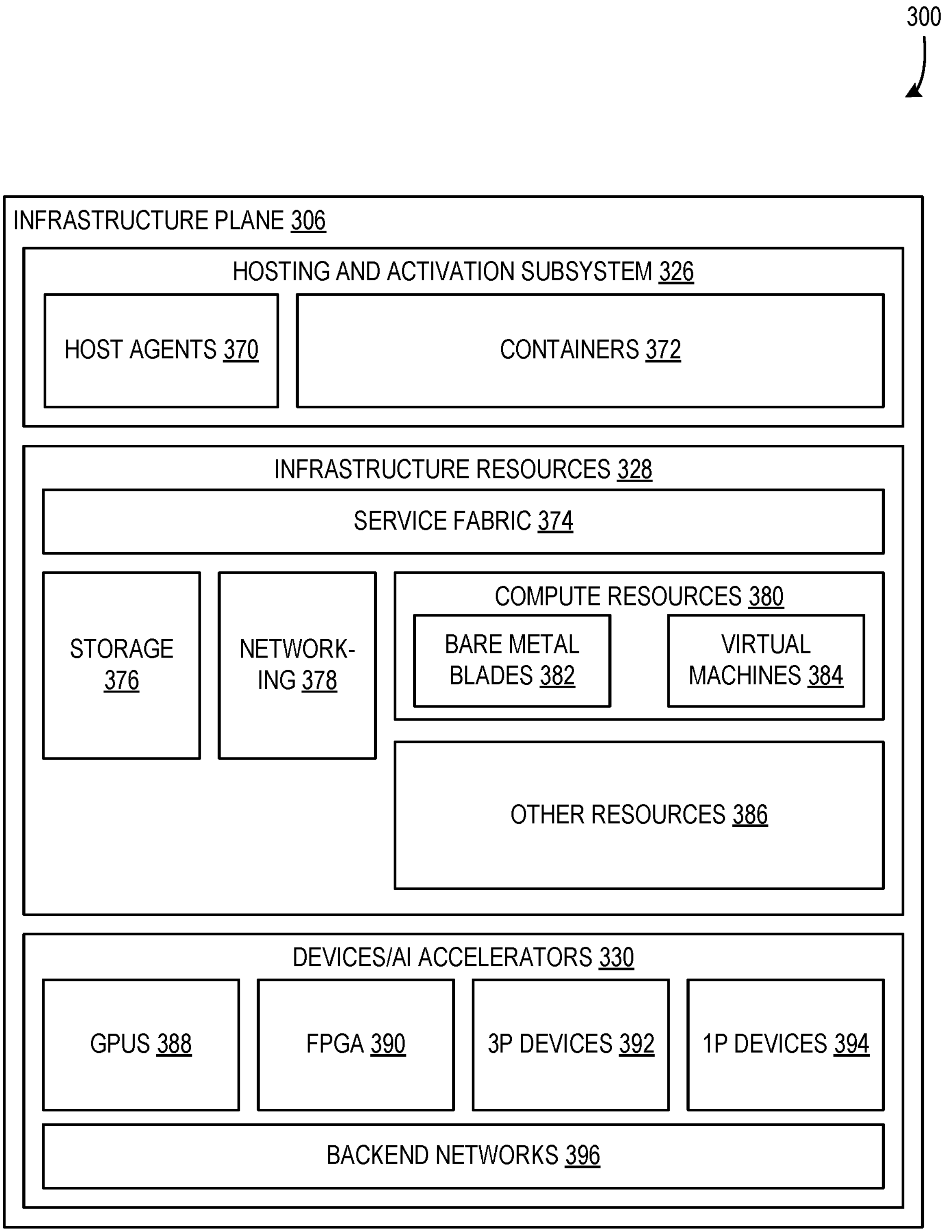
FIG. 3 is a block diagram illustrating an infrastructure plane of the system of FIG. 1.

FIG. 3 is a block diagram 300 illustrating an infrastructure plane 306 of the system 100 of FIG. 1 according to an embodiment. In some examples, the infrastructure plane 306 is substantially the same as the infrastructure plane 106 of FIG. 1, as described above. The infrastructure plane 306 includes a hosting and activation subsystem 326, infrastructure resources 328, and devices and AI accelerators 330.

The hosting and activation sub system 326 includes host agents 370 and containers 372. The host agents 370 enable and organize the hosting of AI workloads on the infrastructure resources 328. The containers 372 (e.g., copy-on-write containers) keep different AI workloads (e.g., workloads from different tenants) separate and secure from each other, even when they are being executed on the same host. A host controlled by a host agent 370 may be a device that includes a set of infrastructure resources 328 that are configured to execute an AI workload or at least a portion thereof. Thus, by separating AI workloads into containers 372, some resources of a host may be used to execute an AI workload from one tenant, while other resources of the host may be used to execute an AI workload of another tenant at the same time. The containers 372 are configured such that the two separated AI workloads are prevented from interacting in any manner while they are being executed.

The infrastructure resources 328 include a service fabric 374 interface, storage resources 376, networking resources 378, compute resources 380 which may include bare metal blades 382 (e.g., physical processing devices) and virtual machines 384, and other resources 386 (e.g., integration infrastructure resources). In some examples, the infrastructure resources 328 are primarily provided for use by the entity that is offering services of the system 100 (e.g., 1 P resources), but in other examples, the infrastructure resources 328 may also include resources provided by other entities (e.g., 3 P resources) such as resources owned and used by tenants of the system 100. Such integration may be enabled via the 3 P libraries 248 and other configurations described above.

The devices and AI accelerators 330 include GPUs 388, FPGA devices 390, other 3 P devices 392, and other 1 P devices 394. The described processes may further be enabled by backend networks 396 and/or associated devices. The execution of AI workloads may uniquely benefit from the use of GPUs 388, FPGAs 390, and/or other specialized hardware. In such examples, infrastructure resources 328, such as compute resources 380, may be linked to GPUs 388, for instance, such that a compute resource 380 provides instructions to the GPU 388 for how to execute steps of the AI workload. Such execution then takes advantage of specialized architecture of the GPU 388, such as the GPU 388 having many cores enabling parallel processing of data to a significant degree beyond the capabilities of the compute resources 380.

The backend networks 396 are configured to support a variety of non-uniform backend network architectures that may be envisioned by a variety of entities that use the system, such as 1 P and 3 P hardware manufacturers. Such backend networks 396 may be used to provide links between disaggregated topologies of compute nodes (e.g., compute resources 380) and hardware accelerators (e.g., GPUs 388).

Figure 4:
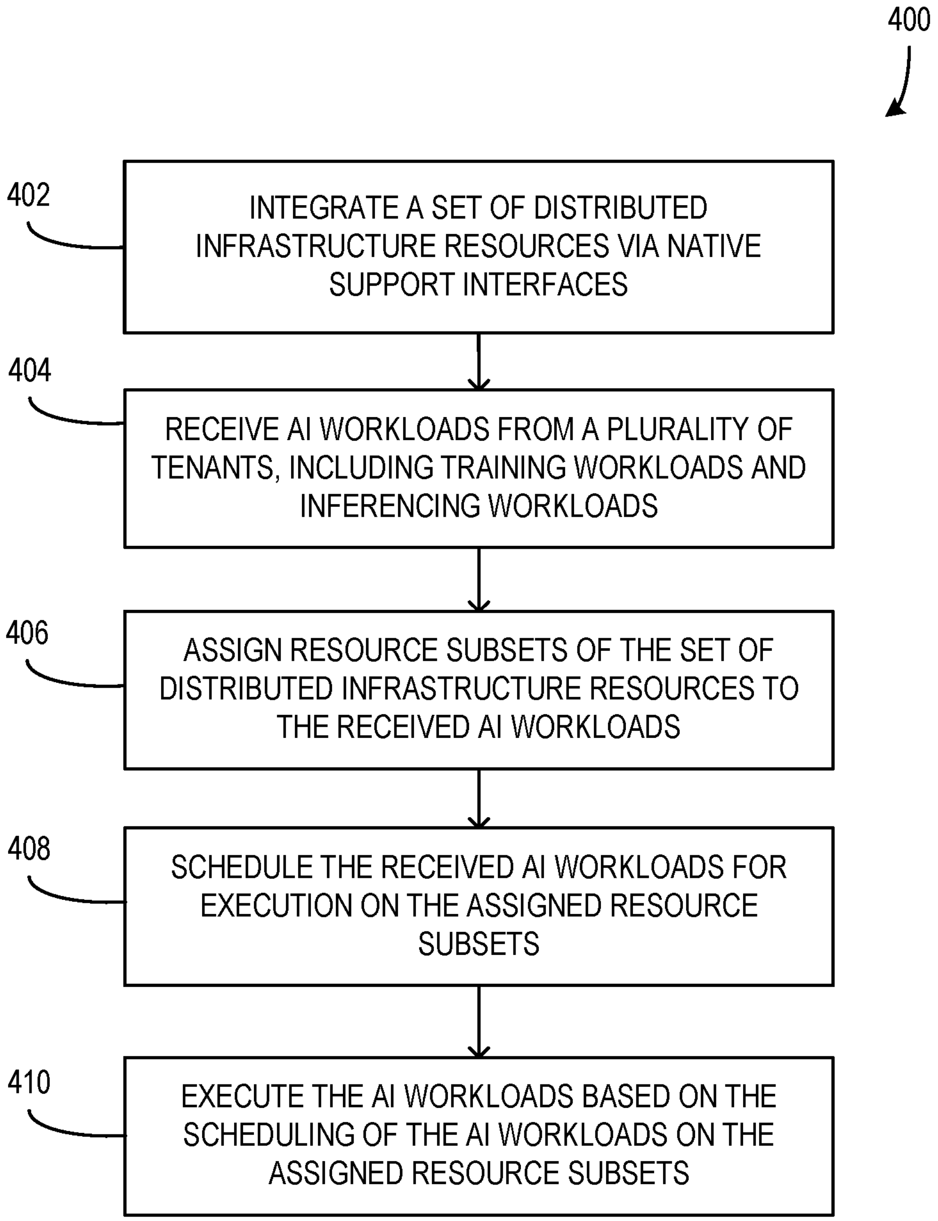
FIG. 4 is a flowchart illustrating a method for managing AI workloads in a cloud infrastructure platform.

FIG. 4 is a flowchart illustrating a method 400 for managing AI workloads in a cloud infrastructure platform according to an embodiment. In some examples, the cloud infrastructure platform of method 400 is a system such as system 100 of FIG.1. At 402, a set of distributed infrastructure resources (e.g., hosting and activation subsystems 126, infrastructure resources 128, and/or devices/AI accelerators 130 of the infrastructure plane 106) are integrated into the cloud infrastructure platform via native support interfaces of those resources. In some examples, the native support interfaces may include interfaces and/or libraries of the providers of the resources, such as the 3 P libraries 248 and 1 P libraries 250 of FIG. 2. For instance, a tenant of the cloud infrastructure platform may provide a subset of infrastructure resources for integration into the platform based on provided libraries, such that the tenant and/or other tenants of the platform may use those resources in execution of AI workloads.

At 404, AI workloads are received from a plurality of tenants, wherein the received AI workloads include training workloads and inferencing workloads. In some examples, the tenants provide AI workloads for execution on the platform via interfaces such as pluggable data planes 110 as described herein.

At 406, resource subsets of the distributed infrastructure resources are assigned to the received AI workloads. In some examples, the assignment of resource subsets to the AI workloads is performed by a global scheduling system 112 as described herein. Assigning the resources may include determining resource requirements of an AI workload and then identifying a subset of infrastructure resources that satisfy those requirements (e.g., an AI workload that requires the use of four GPUs in parallel may be assigned to a node of the system that has at least four GPUs).

Additionally, or alternatively, the assignment of a subset of resources to an AI workload may include rearranging of other AI workloads with respect to the subset of resources. For instance, assigning a resource subset to an AI workload may include saving a state checkpoint of an AI workload that is currently being executed on a first resource subset, migrating that AI workload to a second resource subset, restoring the saved state checkpoint of the migrated AI workload on the second resource subset, and then assigning at least a portion of the first resource subset to another AI workload. In some examples, such processes may be performed using routines of a reliability subsystem 222 as described herein.

At 408, the received AI workloads are scheduled for execution on the assigned resource subsets. In some examples, a global scheduling subsystem 112 generates a schedule for the AI workloads as described herein. Further, scheduling the execution of the AI workloads may include scheduling training workloads and inferencing workloads on the same infrastructure resources and those two types of workloads are multiplexed on those infrastructure resources (e.g., execution of a training workload is interspersed with execution of an inferencing workload on an infrastructure resource, such as a GPU).

Further, in some examples, AI workloads are associated with priorities or tiers that affect how resources are assigned and how AI workloads are scheduled to be executed on those resources. For instance, lower tier AI workloads may be more likely to be migrated to other resources to make space for higher tier AI workloads or higher tier AI workloads may be scheduled for a greater share of resource usage time that lower tier AI workloads, as described herein.

At 410, the AI workloads are executed based on the scheduling of the AI workloads on the assigned resource subsets. In some examples, the AI workloads are hosted in a hosting and activation subsystem 126 and then infrastructure resources 128 and/or devices/AI accelerators 130 are used to execute the AI workloads. For instance, assigning and executing AI workloads on resource subsets includes isolating the AI workloads from each other in secure containers, whereby AI workloads associated with different tenants are securely executed alongside each other (e.g., on resources associated with the same server).

Further, in some examples, executing AI workloads are monitored based on the performance of the cloud infrastructure platform and, based on that monitoring, the scheduling of the AI workloads is adjusted. The adjusting of the scheduling may include preempting an AI workload, migrating an AI workload, scaling up an AI workload, scaling down an AI workload, and/or load-balancing between two or more AI workloads. Such schedule adjustment may be performed by a global scheduling subsystem 112 or other component of the system 100.

Figure 5:
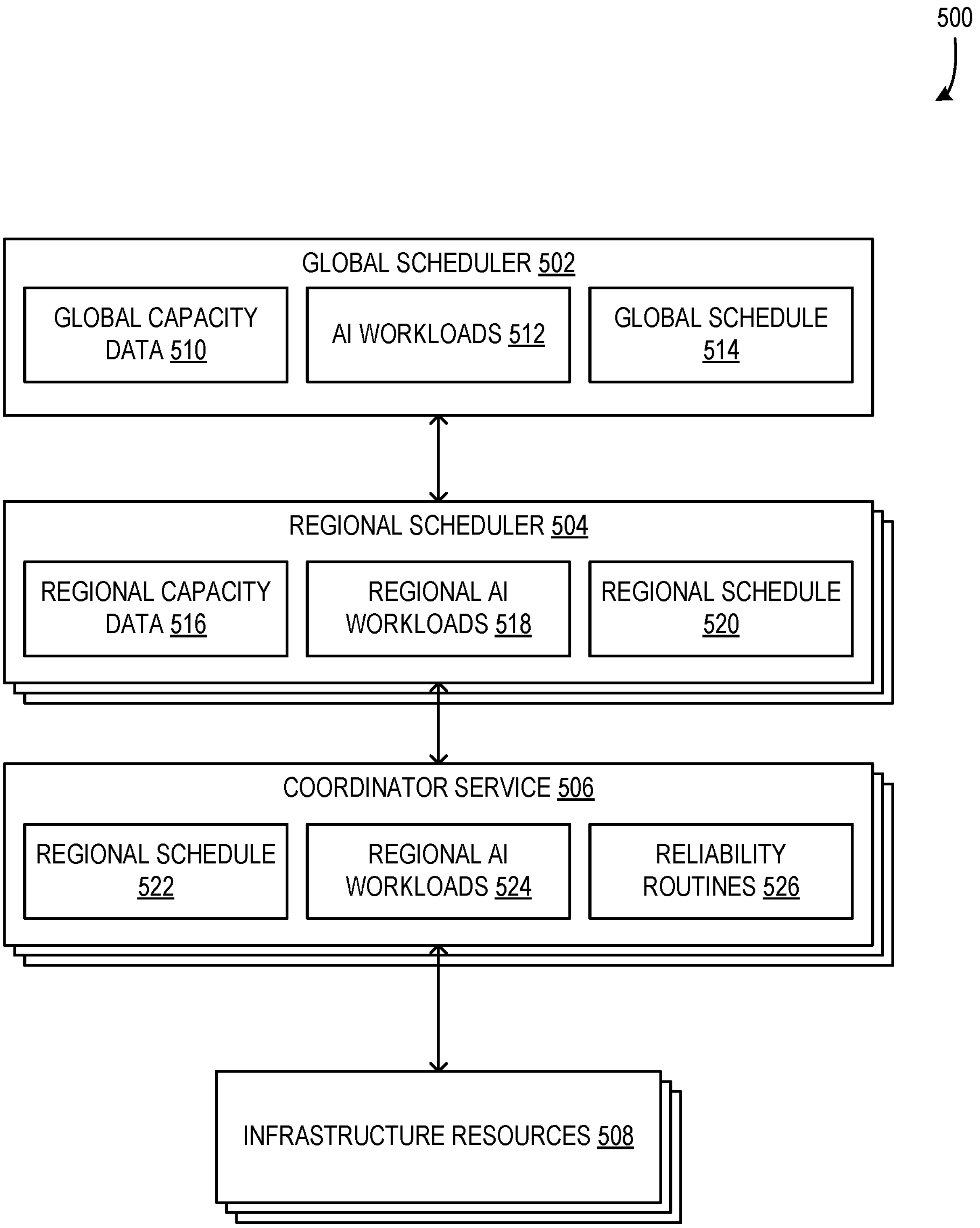
FIG. 5 is a block diagram illustrating a hierarchical scheduling subsystem configured for scheduling AI workloads.

FIG. 5 is a block diagram illustrating a hierarchical scheduling subsystem 500 configured for scheduling AI workloads 512 according to an embodiment. In some examples, the scheduling subsystem 500 is included in a system such as system 100 of FIG. 1. For instance, the scheduling subsystem 500 may be substantially the same as the global scheduling subsystem 112 of FIG. 1. The scheduling subsystem 500 includes a global scheduler 502 and multiple regional schedulers 504, coordinator services 506, and associated infrastructure resources 508. The global scheduler 502 is configured to use the global capacity data 510 (e.g., data indicating the current state of resource usage throughout the associated global infrastructure system, including resource usage in each region of the system) and AI workloads 512 to generate a global schedule 514 that schedules the AI workloads 512 to be executed on the infrastructure resources 508. The global scheduler 514 includes regional schedules 520 for each region of the system, which are then provided to the regional schedulers 504 associated with those regions (e.g., a regional scheduler 520 of a region is provided to the regional scheduler 504 associated with that particular region).

The regional schedulers 504 monitor the current regional capacity data 516 of the infrastructure resources 508 associated with the respective regions and that regional capacity data 516 is provided to the global scheduler 502 periodically or based on a pattern or a triggering event. Further, the regional schedulers 504 receive the regional AI workloads 518 associated with their regions from the global scheduler 502 from the set of AI workloads 512. The regional schedulers 504 are also configured to instruct the coordinator services 506 to execute the associated regional schedules 520 using the data of the regional AI workloads 518 (each region includes a regional scheduler 504 and a coordinator service 506).

The coordinator services 506 are configured to receive a regional schedule 522 and associated regional AI workloads 524 from an associated regional scheduler 504 and to use the reliability routines 526 (e.g., the routines of the reliability subsystem 222 of FIG. 2 as described above) to cause the regional AI workloads 524 to be executed using infrastructure resources 508 of the region based on the regional scheduler 522. For instance, a coordinator service 506 may be configured to allocate a subset of infrastructure resource 508 of the region to a regional AI workload 524 and cause that workload 524 to be executed on those allocated resources 508. Additionally, or alternatively, a coordinator service 506 may be configured to checkpoint, restore, migrate, and/or perform other reliability routines 526 to arrange the use of the infrastructure resources 508 according to the regional schedule 522.

Exemplary Operating Environment

Figure 6:
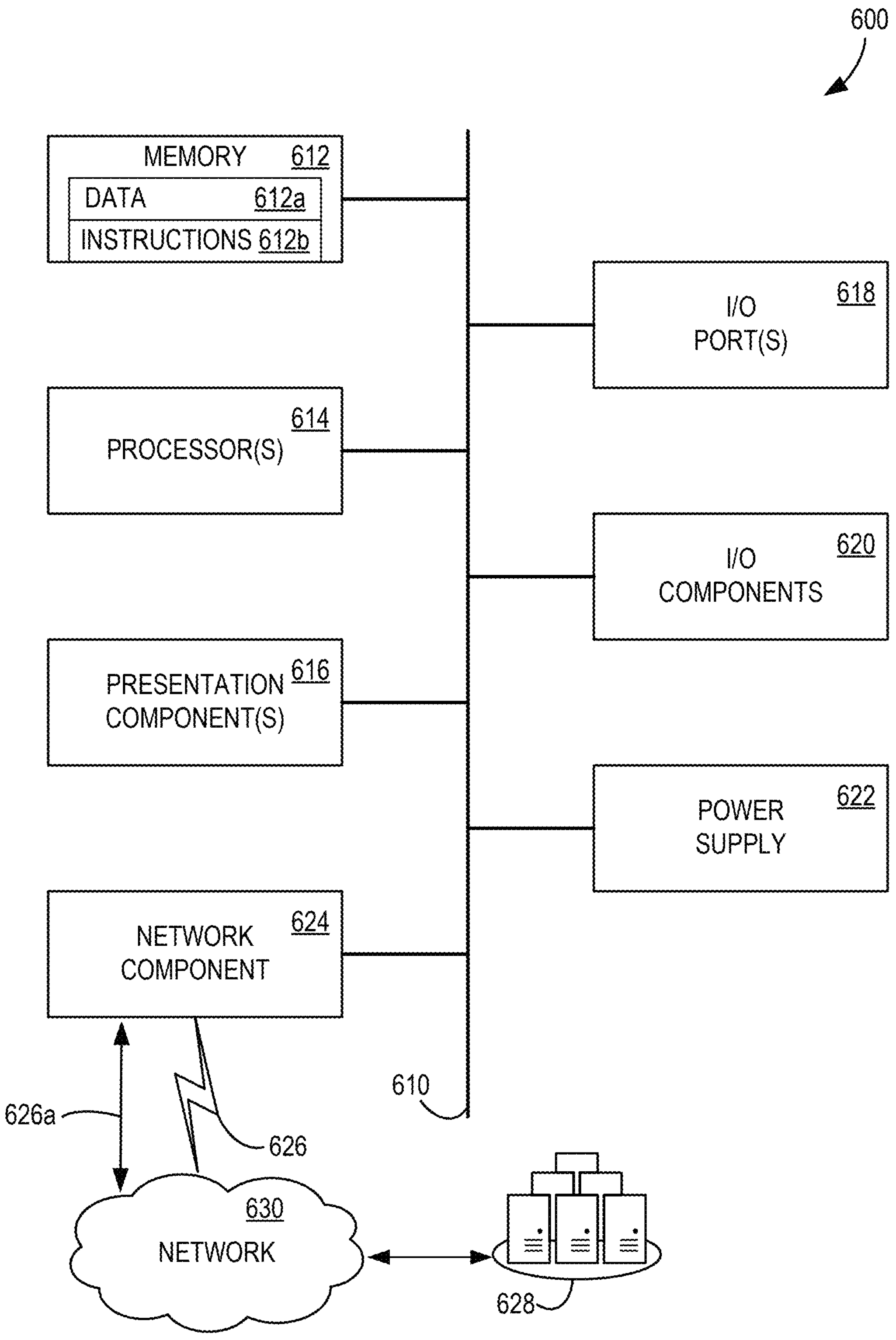
FIG. 6 is a block diagram of an example computing device for implementing aspects disclosed herein.

FIG. 6 is a block diagram of an example computing device 600 for implementing aspects disclosed herein, and is designated generally as computing device 600. Computing device 600 is but one example of a suitable computing environment and is not intended to suggest any limitation as to the scope of use or functionality of the examples disclosed herein. Neither should computing device 600 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 600 includes a bus 610 that directly or indirectly couples the following devices: computer-storage memory 612, one or more processors 614, one or more presentation components 616, input/output (I/O) ports 618, I/O components 620, a power supply 622, and a network component 624. While computing device 600 is depicted as a seemingly single device, multiple computing devices 600 may work together and share the depicted device resources. For example, memory 612 is distributed across multiple devices, and processor(s) 614 is housed with different devices.

Bus 610 represents what may be one or more busses (such as an address bus, data bus, or a combination thereof). Although the various blocks of FIG. 6 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 6 and the references herein to a "computing device." Memory 612 may take the form of the computer-storage media references below and operatively provide storage of computer-readable instructions, data structures, program modules and other data for the computing device 600. In some examples, memory 612 stores one or more of an operating system, a universal application platform, or other program modules and program data. Memory 612 is thus able to store and access data **612*a* and instructions 612*b* that are executable by processor 614** and configured to carry out the various operations disclosed herein.

In some examples, memory 612 includes computer-storage media in the form of volatile and/or nonvolatile memory, removable or non-removable memory, data disks in virtual environments, or a combination thereof. Memory 612 may include any quantity of memory associated with or accessible by the computing device 600. Memory 612 may be internal to the computing device 600 (as shown in FIG. 6), external to the computing device 600 (not shown), or both (not shown). Examples of memory 612 in include, without limitation, random access memory (RAM); read only memory (ROM); electronically erasable programmable read only memory (EEPROM); flash memory or other memory technologies; CD-ROM, digital versatile disks (DVDs) or other optical or holographic media; magnetic cassettes, magnetic tape, magnetic disk storage or other magnetic storage devices; memory wired into an analog computing device; or any other medium for encoding desired information and for access by the computing device 600. Additionally, or alternatively, the memory 612 may be distributed across multiple computing devices 600, for example, in a virtualized environment in which instruction processing is carried out on multiple devices 600. For the purposes of this disclosure, "computer storage media," "computer-storage memory," "memory," and "memory devices" are synonymous terms for the computer-storage memory 612, and none of these terms include carrier waves or propagating signaling.

Processor(s) 614 may include any quantity of processing units that read data from various entities, such as memory 612 or I/O components 620. Specifically, processor(s) 614 are programmed to execute computer-executable instructions for implementing aspects of the disclosure. The instructions may be performed by the processor, by multiple processors within the computing device 600, or by a processor external to the client computing device 600. In some examples, the processor(s) 614 are programmed to execute instructions such as those illustrated in the flow charts discussed below and depicted in the accompanying drawings. Moreover, in some examples, the processor(s) 614 represent an implementation of analog techniques to perform the operations described herein. For example, the operations are performed by an analog client computing device 600 and/or a digital client computing device 600. Presentation component(s) 616 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 600, across a wired connection, or in other ways. I/O ports 618 allow computing device 600 to be logically coupled to other devices including I/O components 620, some of which may be built in. Example I/O components 620 include, for example but without limitation, a microphone, joystick, game pad, satellite dish, scanner, printer, wireless device, etc.

The computing device 600 may operate in a networked environment via the network component 624 using logical connections to one or more remote computers. In some examples, the network component 624 includes a network interface card and/or computer-executable instructions (e.g., a driver) for operating the network interface card. Communication between the computing device 600 and other devices may occur using any protocol or mechanism over any wired or wireless connection. In some examples, network component 624 is operable to communicate data over public, private, or hybrid (public and private) using a transfer protocol, between devices wirelessly using short range communication technologies (e.g., near-field communication (NFC), BLUETOOTH branded communications, or the like), or a combination thereof. Network component 624 communicates over wireless communication link 626 and/or a wired communication link **626*a* to a cloud resource 628 across network 630. Various different examples of communication links 626 and 626*a*** include a wireless connection, a wired connection, and/or a dedicated link, and in some examples, at least a portion is routed through the internet.

Although described in connection with an example computing device 600, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality (MR) devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for managing AI workloads in a cloud infrastructure platform comprises: at least one processor of the cloud infrastructure platform; and at least one memory of the cloud infrastructure platform comprising computer program code, the at least one memory and the computer program code configured to, with the at least one processor, cause the at least one processor to: integrate a set of distributed infrastructure resources via native support interfaces; receive AI workloads from a plurality of tenants, wherein the AI workloads include training workloads and inferencing workloads; assign resource subsets of the set of distributed infrastructure resources to the received AI workloads; schedule the received AI workloads for execution on the assigned resource subsets; and execute the AI workloads based on the scheduling of the AI workloads on the assigned resource subsets.

An example computerized method for managing AI workloads in a cloud infrastructure platform comprises: integrating, by at least one processor of the cloud infrastructure platform, a set of distributed infrastructure resources via native support interfaces; receiving, by the at least one processor, AI workloads from a plurality of tenants, wherein the AI workloads include training workloads and inferencing workloads; assigning, by the at least one processor, resource subsets of the set of distributed infrastructure resources to the received AI workloads; scheduling, by the at least one processor, the received AI workloads for execution on the assigned resource subsets; and executing, by the at least one processor, the AI workloads based on the scheduling of the AI workloads on the assigned resource subsets.

One or more computer storage media have computer-executable instructions for managing AI workloads in a cloud infrastructure platform that, upon execution by a processor, cause the processor to at least: integrate a set of distributed infrastructure resources via native support interfaces; receive AI workloads from a plurality of tenants, wherein the AI workloads include training workloads and inferencing workloads; assign resource subsets of the set of distributed infrastructure resources to the received AI workloads; schedule the received AI workloads for execution on the assigned resource subsets; and execute the AI workloads based on the scheduling of the AI workloads on the assigned resource subsets.

Alternatively, or in addition to the other examples described herein, examples include any combination of the following:

wherein assigning the resource subsets to the received AI workloads includes isolating the AI workloads from each other in secure containers, whereby AI workloads associated with different tenants are securely executed alongside each other.

wherein assigning resource subsets of the set of distributed infrastructure resources to the received AI workloads further includes: saving a state checkpoint of a first AI workload that is being executed on a first resource subset; migrating the first AI workload to a second resource subset; restoring the saved state checkpoint of the first AI workload on the second resource subset; and assigning at least a portion of the first resource subset to a second AI workload.

wherein scheduling the received AI workloads for execution of the assigned resource subsets includes multiplexing execution of at least two AI workloads on at least one resource of an assigned resource subset.

wherein the at least two AI workloads include a training workload and an inferencing workload; and wherein the multiplexing of execution of the training workload and the inferencing workload on the at least one resource is based on differing resource use between the training workload and the inferencing workload.

further comprising: monitoring, by the at least one processor, the executing of the AI workloads based on performance of the cloud infrastructure platform; and based on the monitoring, adjusting, by the at least one processor, the scheduling of the AI workloads, whereby performance of the cloud infrastructure platform is improved, and wherein the adjusting includes at least one of the following: preempting an AI workload, migrating an AI workload, scaling up an AI workload, scaling down an AI workload, and load-balancing between at least two AI workloads.

wherein each AI workload of the received AI workloads is associated with a priority tier; and wherein assigning resource subsets to the received AI workloads and scheduling the received AI workloads for execution on the assigned resource subsets are based on the associated priority tiers of the AI workloads.

The embodiments illustrated and described herein as well as embodiments not specifically described herein but within the scope of aspects of the claims constitute an exemplary means for integrating, by at least one processor of the cloud infrastructure platform, a set of distributed infrastructure resources via native support interfaces; exemplary means for receiving, by the at least one processor, AI workloads from a plurality of tenants, wherein the AI workloads include training workloads and inferencing workloads; exemplary means for assigning, by the at least one processor, resource subsets of the set of distributed infrastructure resources to the received AI workloads; exemplary means for scheduling, by the at least one processor, the received AI workloads for execution on the assigned resource subsets; and exemplary means for executing, by the at least one processor, the AI workloads based on the scheduling of the AI workloads on the assigned resource subsets.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for managing artificial intelligence (AI) workloads in a cloud infrastructure platform, the system comprising:

a processor of the cloud infrastructure platform; and a memory of the cloud infrastructure platform comprising computer program code, the memory and the computer program code configured to, with the processor, cause the processor to:

execute a first AI workload on a first resource, the first resource comprising first AI accelerator hardware, the first AI workload utilizing the first AI accelerator hardware for AI training or inferencing an AI model;

execute a graphics processing unit (GPU)-related application programming interface (API) call that generates a physical handle to a GPU object, the GPU object comprising at least one of a stream, an event, or a library context;

store the GPU-related API call in a log;

intercept, by a checkpointing system, the physical handle generated by the first AI accelerator hardware;

return, to the AI workload, a virtual handle in place of the physical handle, wherein the virtual handle is stored in a host-side data structure for use in a subsequent GPU-related API call;

maintain, by the checkpointing system, a mapping between the virtual handle and the physical handle generated by the first AI accelerator hardware;

checkpointing the AI workload by saving a checkpoint state comprising the log and the mapping;

migrate the first AI workload to a second resource, the second resource being distinct from the first resource and comprising second AI accelerator hardware; and restore the checkpoint state of the first AI workload on the second resource, the restoring comprising:

replaying the log, including the GPU-related API call, on the second resource;

generating a new physical handle corresponding to the GPU object;

updating the mapping to associate the virtual handle with the new physical handle; and resuming execution of the AI workload using the virtual handle.

2. The system of claim 1, wherein the first AI workload is isolated in a secure container.

3. The system of claim 1, the memory and the computer program code configured to, with the processor, further cause the processor to:

monitor performance of the first AI workload; and based on the monitoring, adjust scheduling of the first AI workload, wherein the adjusting includes at least one of: preempting one of the first workload and a second AI workload, migrating the first AI workload, scaling up the first AI workload, scaling down the first AI workload, and load-balancing between the first and second AI workloads.

4. The system of claim 1, wherein the first AI workload is associated with a priority tier and wherein the first resource is assigned to the first AI workload that is executed on the first resource based on the priority tier of the first AI workload.

5. A computerized method for managing artificial intelligence (AI) workloads in a cloud infrastructure platform, the computerized method comprising:

receiving a first AI workload from a first tenant;

scheduling the first AI workload for execution on a first resource selected from a group of heterogeneous distributed infrastructure resources, the first resource comprising first AI accelerator hardware;

executing the first AI workload on the first resource based on the scheduling, whereby the first AI workload executes using the first AI accelerator hardware;

executing a graphics processing unit (GPU)-related application programming interface (API) call that generates a physical handle to a GPU object, the GPU object comprising at least one of a stream, an event, or a library context;

storing the GPU-related API call in a log;

intercepting, by a checkpointing system, the physical handle generated by the first AI accelerator hardware;

returning, to the AI workload, a virtual handle in place of the physical handle, wherein the virtual handle is stored in a host-side data structure for use in a subsequent GPU-related API call;

maintaining, by the checkpointing system, a mapping between the virtual handle and the physical handle generated by the first AI accelerator hardware;

monitoring performance of the first AI workload; and based on the monitoring, migrating the first AI workload to a second resource that is distinct from the first resource and comprising second AI accelerator hardware, the migrating comprising;

checkpointing the AI workload by saving a checkpoint state comprising the log and the mapping;

restoring the GPU-related API call on the second resource;

generating a new physical handle corresponding to the GPU object;

updating the mapping to associate the virtual handle with the new physical handle; and resuming execution of the AI workload using the virtual handle.

6. The method of claim 5, wherein the executing of the first AI workload includes isolating the first AI workload in a secure container.

7. The method of claim 5, wherein the scheduling of the first AI workload includes:

saving a state checkpoint of a second AI workload that is being executed on the first resource, the second AI workload using the first AI accelerator hardware;

migrating the second AI workload to a second resource;

restoring the state checkpoint of the second AI workload on the second resource; and assigning first resource to the first AI workload.

8. The method of claim 5, wherein:

the first AI workload is a training workload and a second AI workload is an inferencing workload; and the scheduling comprises multiplexing execution of the first AI workload and the second AI workload on the GPU by interspersing execution of the first AI workload and the second AI workload on the GPU.

9. The method of claim 5, wherein the first AI workloads is associated with a priority tier and wherein the scheduling of the first AI workload for execution on the first resource is based on the priority tier of the first AI workload.

10. A computer storage medium having computer-executable instructions for migrating an artificial intelligence (AI) workload wherein, upon execution by a processor, the computer-executable instructions cause the processor to perform operations comprising: executing the AI workload on a first resource comprising a graphics processor unit (GPU) for AI acceleration, the executing comprising:

executing a GPU-related application programming interface (API) call that generates a physical handle to a GPU object, the GPU object comprising at least one of a stream, an event, or a library context;

storing the GPU-related API call in a log;

intercepting, by a checkpointing system, the physical handle generated by the GPU;

returning, to the AI workload, a virtual handle in place of the physical handle, wherein the virtual handle is stored in host-side data structure for use in a subsequent GPU-related API call;

maintaining, by the checkpointing system, a mapping between the virtual handle and the physical handle generated by the GPU;

checkpointing the AI workload by saving a checkpoint state comprising the log and the mapping;

migrating the AI workload to a second resource that is separate from the first resource;

restoring the checkpoint state of the AI workload on the second resource, the restoring comprising:

replaying the log, including the GPU-related API call, on the second resource;

generating a new physical handle corresponding to the GPU object;

updating the mapping to associate the virtual handle with the new physical handle; and resuming execution of the AI workload using the virtual handle.

11. The computer storage medium of claim 10, wherein the executing of the AI workload includes isolating the AI workload in a secure container.

12. The computer storage medium of claim 10, wherein:

the AI workload is a training workload and a second AI workload is an inferencing workload; and the executing comprises multiplexing execution of the AI workload and the second AI workload on the GPU by interspersing execution of the AI workload and the second AI workload on the GPU.

13. The computer storage medium of claim 12, wherein the computer-executable instructions, upon execution by the processor, further cause the processor to at least:

monitor performance of the and second AI workloads; and based on the monitoring, adjust an assignment of the first resource to the AI workload and the second AI workload, wherein the adjusting includes at least one of preempting the first AI workload, migrating the first AI workload, scaling up the first AI workload, scaling down the first AI workload, or load-balancing between at the first and second AI workloads.

14. The system of claim 1, the memory and the computer program code configured to, with the processor, further cause the processor to: multiplex execution of the first AI workload and a second AI workload on the first resource.

15. The system of claim 14, wherein:

the first AI workload is a training workload and the second AI workload is an inferencing workload; and the multiplexing of the execution of the training workload and the inferencing workload is based on differing resource use between the training workload and the inferencing workload.

16. The system of claim 14, wherein the multiplexing of the execution of the first and second AI workloads comprises interspersing execution of the first AI workload and the second AI workload on the GPU.

17. The method of claim 5, wherein scheduling the first AI workload for execution includes multiplexing execution of the first AI workload with a second AI workload on the GPU.

18. The computerized method of claim 7, wherein the restoring of the state checkpoint on the second resource comprises replaying calls to the GPU on a second resource.

19. The computer storage medium of claim 10, wherein the resuming of execution of the AI workload includes multiplexing execution of the AI workload with a second AI workload on the second resource.

20. The computer storage medium of claim 12, wherein the multiplexing is based on differing resource use between the training workload and the inferencing workload.

* * * * *